US010277478B2

(12) United States Patent
Stoops et al.

(10) Patent No.: US 10,277,478 B2
(45) Date of Patent: Apr. 30, 2019

(54) CONNECTED MACHINE INITIATED SERVICE

(71) Applicant: GENESYS TELECOMMUNICATIONS LABORATORIES, INC., Daly City, CA (US)

(72) Inventors: Daniel Stewart Stoops, Powell, OH (US); Lizanne Kaiser, Richmond, CA (US); Cliff W. Bell, Kalispell, MT (US)

( * ) Notice: Subject to any disclaimer, the term of this patent is extended or adjusted under 35 U.S.C. 154(b) by 189 days.

(21) Appl. No.: 15/176,502

(22) Filed: Jun. 8, 2016

(65) Prior Publication Data
US 2017/0359232 A1 Dec. 14, 2017

(51) Int. Cl.
*H04L 12/24* (2006.01)
(52) U.S. Cl.
CPC ...... *H04L 41/5061* (2013.01); *H04L 41/0686* (2013.01)
(58) Field of Classification Search
CPC ............. H04L 41/5061; H04L 65/1069; H04L 41/0686
See application file for complete search history.

(56) References Cited

U.S. PATENT DOCUMENTS

| 6,330,499 | B1 | 12/2001 | Chou |
| 2011/0294466 | A1 | 12/2011 | Tang et al. |
| 2011/0299523 | A1 | 12/2011 | Brown et al. |
| 2012/0108230 | A1 | 5/2012 | Stepanian |
| 2012/0252475 | A1 | 10/2012 | Farrell et al. |
| 2014/0022328 | A1* | 1/2014 | Gechter ............... G06Q 30/06 348/14.02 |
| 2015/0049869 | A1 | 2/2015 | Petrovykh et al. |
| 2015/0264148 | A1 | 9/2015 | Skiba et al. |
| 2017/0359421 | A1 | 12/2017 | Stoops et al. |

OTHER PUBLICATIONS

International Search Report and Written Opinion for Application No. PCT/US2017/036214, dated Sep. 13, 2017, 22 pages.

* cited by examiner

*Primary Examiner* — Kim T Nguyen

(57) ABSTRACT

Event data that includes an identification of a registered device and a state of the registered device may be received by a contact center, where the registered device is different from the user device. A resource requirement for a communications session between a user device and an agent device may be determined by the contact center based on the event data. Routing information that enables the user device to establish a communications session with the agent device without a need for a user of the user device to provide the identification of the registered device to an agent of the agent device may be generated by the contact center based on the resource requirement.

16 Claims, 7 Drawing Sheets

CONNECTED MACHINE INITIATED SERVICE

TECHNICAL FIELD

The following disclosure relates generally to communications between a device and a contact center.

BACKGROUND

A communications system may provide interactions among a user device, a contact center, and registered devices to resolve events associated with the one or more register devices.

SUMMARY

In a general aspect, the subject matter described in this specification can be embodied in methods that include the actions of receiving, by a contact center, event data that includes an identification of a registered device and a state of the registered device, where the registered device is different from the user device; determining, by the contact center and based on the event data, a resource requirement for the communications session between the user device and the agent device; and generating, by the contact center and based on the resource requirement, routing information that enables the user device to establish a communications session with the agent device without a need for a user of the user device to provide the identification of the registered device to an agent of the agent device.

Implementations may include one or more of the following features. For example, the routing information for determining an inbound routing decision may be stored. Contact information that includes a reserved contact for establishing the communications session with the agent device may be transmitted from the contact center. A request to establish the communications session with an agent device may be received from the user device and by the contact center. The contact center may determine that the request corresponds to the routing information. In response to determining that the request corresponds to the routing information, the request may be routed to establish the communications session between the user device and the agent device.

To transmit the contact information, the contact information may be transmitted to the user device. To transmit the contact information, the contact information may be transmitted to a digital service interface that is different from the user device. The reserved contact may be a reserved telephone number. To determine that the request corresponds to the routing information, the contact center may determine, based on a dialed number identification service (DNIS), that the request includes the reserved telephone number.

The identification of the registered device and the state of the registered device may be provided to the agent device. A dynamically generated message to be presented to the user of the user device during the communications session between the user device and the agent device may be determined by the contact center based on the event data. In response to determining that the request corresponds to the routing information, after establishing the communications session between the user device and the agent device, the contact center may communicate the dynamically generated message to the user device for presentation to the user.

Contact information of the user device may be identified. A request to establish the communications session between the user device and the agent device may be transmitted to the user device by the contact center. The contact center may determine that the request has been accepted by the user device. In response to determining that the request has been accepted by the user device, the contact center may establish the communications session between the user device and the agent device based on the routing information. The identification of the registered device and the state of the registered device may be provided to the agent device.

One or more recommendations associated with the registered device may be determined based on the event data by a recommendation server. The one or more recommendations associated with the registered device may be provided to the agent device.

Registered device profiles of one or more registered devices may be stored at the contact center. To determine the resource requirement for the communications session between the user device and the agent device, it may be determined that the identification of the registered device matches with a particular registered device profile of the registered device profiles. The resource requirements may be determined based on the particular registered device profile.

To determine the resource requirement for the communications session between the user device and the agent device, a service level agreement associated with the registered device may be retrieved based on the identification of the registered device. The resource requirement based on the service level agreement may be determined. To generate the routing information, the routing information that enables the user device to establish the communications session with the agent device may be generated by the contact center and based on the resource requirement without a need for a user of the user device to provide the state of the registered device to the agent of the agent device.

In another general aspect, the subject matter described in this specification can be embodied in methods that include the actions of determining, by a digital service interface, a state of a registered device that is different from the user device; transmitting, to the contact center and by the digital service interface, first event data that includes an identification of the registered device and the state of the registered device; and providing, to a user of the user device, second event data that includes the state of the registered device and information that enables the user to establish the communications session with the contact center.

Implementations may include one or more of the following features. For example, to determine the state of the registered device, data from the registered device indicating the state of the registered device may be received. To determine the state of the registered device, it may be determined that data has not been received from the registered device within a predetermined time period.

To transmit the first event data to the contact center, the registered device may be communicated, using a first communications protocol, to obtain the state of the registered device.

The first event data that includes the state of the registered device may be generated, based on a second communications protocol that is different from the first communications protocol. The first event data to the contact center may be transmitted using the second communications protocol.

To provide the second event data to the user, the second event data may be presented to the user via a display of the digital service interface. To provide the second event data to the user, the second event data may be transmitted to the user device. To provide the second event data to the user, the information that enables the user to establish the communications session with the contact center may be received from the contact center.

After the communications session is established between the user device and the contact center, a request from the contact center to obtain additional data associated with the registered device may be received by the digital service interface. In response to receiving the request from the contact center, the additional data may be obtained by the digital service interface from the registered device. The additional data to the contact center may be transmitted by the digital service interface.

The digital service interface may be embedded in the registered device. The digital service interface may be an application executed by the user device. The digital service interface may be implemented on a device that is different from the registered device and the user device. The information that enables the user to establish the communications session with the contact center may include a telephone number. The information that enables the user to establish the communications session with the contact center may include scripts that are executable by the digital service interface or the user device to enable the user to establish the communications session with the contact center without dialing a telephone number.

The details of one or more implementations are set forth in the accompanying drawings and the description below. Other potential features and advantages will become apparent from the description, the drawings, and the claims.

DETAILED DESCRIPTION

Figure 1:
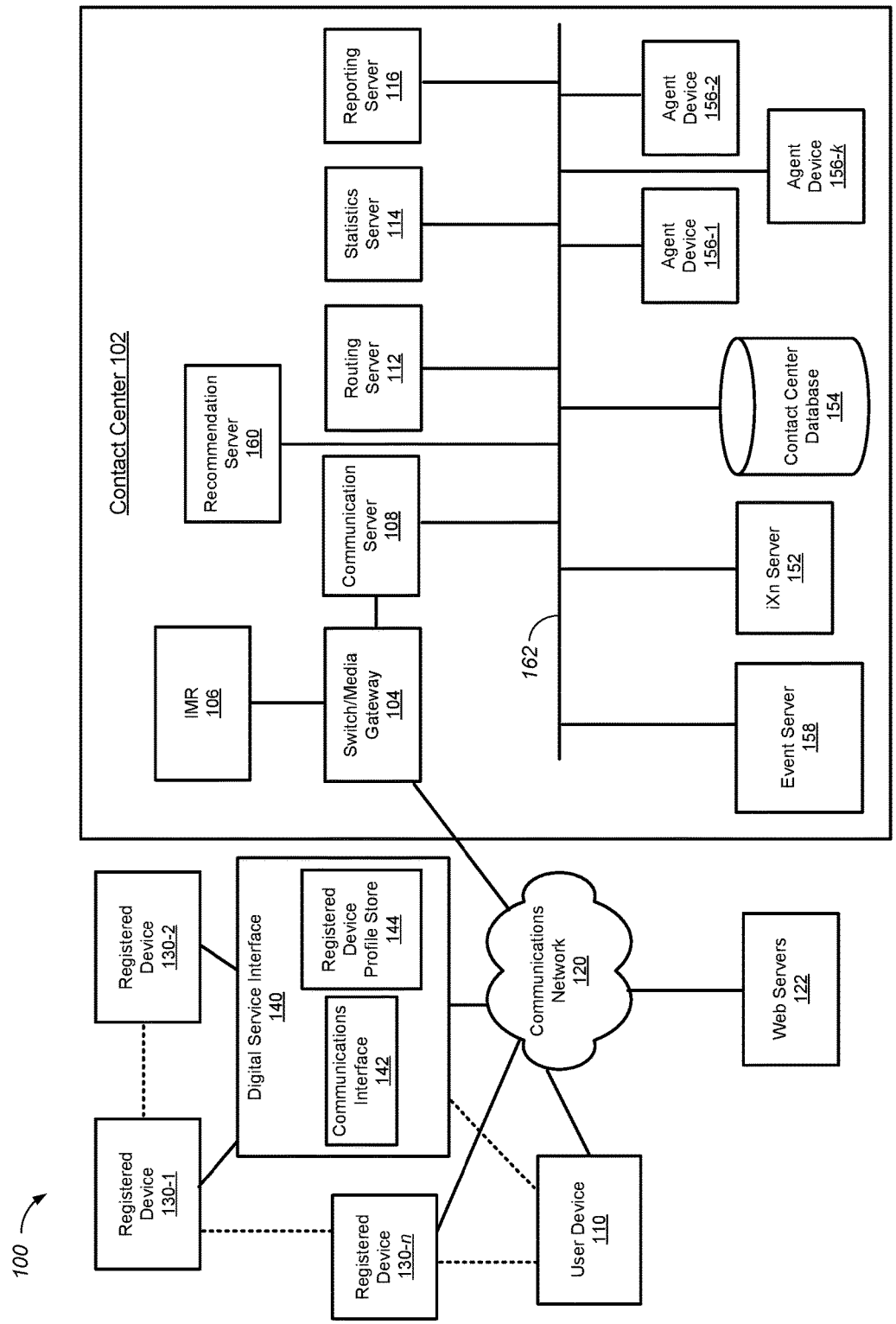
FIG. 1 is a block diagram of a communications system that enables interactions among a user device, a contact center, and one or more registered devices to resolve events associated with the one or more registered devices.

A company (or an enterprise, which is used in this description interchangeably) may wish to enable its customers to contact it through use of a contact center via any of multiple different communications channels (e.g., phone, email, chat, SMS or another communications channel that supports communications between a customer and a service/product provider). For example, a failure tied to a defective product that the company has sold to a customer may lead the customer to engage a customer service call with an agent through the contact center. A contact center may be a department within an organization or enterprise that is responsible for handling user-interactions for service and/or sales, such as (but not limited to), a contact center, branch store, administrative office, etc.—hereafter referred to as "contact center." Critical in this process is the ability of the customer and/or the contact center to identify the product through some unique "product identifier" (e.g., a brand or product name, a model or serial number, a version number, etc.). There are several conventional ways to communicate the product identifier to a contact center prior to the service call. A first approach is to have paper warranty cards filled out and submitted to the company when a new product (e.g., an industrial furnace, AC unit, or enterprise server) is purchased or installed. This process could also be completed by paper or electronically. In either case, after sending in the warranty card or submitting the information electronically, there is no longer any physical association with the purchased/installed product. Therefore, later on when service or sales support is required for that particular product, the customer must spend significant time conveying the identification of the product to the contact center.

A second approach is to attempt to automate capturing the unique product identifying information, for instance through an interactive voice response (IVR) automated voice system. However, due to the complex and highly varied format of a product's unique identifier, this information typically cannot be entered using touchtone-only (e.g., using dual-tone multi-frequency signaling). Some enterprises attempt to address this by providing a speech-recognition enabled interface, so that the caller can speak the product identifier (e.g., product name, model or serial number, etc.). However, depending on the complexity of the product identifier (e.g., alphanumeric string of variable lengths and patterns, proper names used in brand and model names, etc.), state-of-the-art speech recognition systems may still struggle to deliver good usability and high accuracy in capturing this information. This technology limitation, along with the fact that most customers do not know this unique product identifier information to begin with, makes the second approach inadequate for many product support situations.

A third approach is a connected-machine that gives indications about itself to a diagnostic tool or series of diagnostic monitoring services. A connected-machine may be a product, device, system, or apparatus that is embedded with electronics, software, sensors, and/or network connectivity to enable the machine to connect to a network and to collect and exchange data with another product, device, system, or apparatus through the network. When multiple connected-machines are connected through a public or a private network, they may be referred to collectively as the "Internet of Things (IoT)." For example, an enterprise server may be embedded with a temperature sensor, where the enterprise server may send a warning to an administrator in the event that the temperature sensed by the temperature sensor exceeds a threshold value. The administrator may then contact the contact center for further assistance. This method can be more efficient, but would still fail when the product itself cannot function properly to deliver diagnostic information. Moreover, when a product sends indications to another device or to a contact center, the contact center may still not get any warning regarding the customer service call that may occur later, and may still route the customer service call blindly to a wrong agent or play a series of IVR prompts to collect information in order to route the call to the appropriate agent. In addition, this approach requires changes to the product itself to implement this tool or service, and may not be done retroactively after the product has been sold or deployed.

As described above, without specific input by the customer, in many instances there is little or no electronic data readily available for the contact center to identify the product and/or to determine the most appropriate resources available to address the problem. In other words, the customer has to answer questions about the registered product before the customer is able to be connected the most appropriate agent. The product information may be difficult to identify because (i) the customer may not have this product information memorized, (ii) the customer may not have the product information readily at hand at the moment the customer contacts the company trying to trouble-shoot a problem or get sales support, (iii) the product information may be printed on a label hidden inside the body of the product, (iv) there may be several sets of numbers on the label, or (v) the product information may be on a warranty card instead of on the product. Moreover, oftentimes the format and content of the product-identifying information is very complex and arbitrary (e.g., alpha-numeric strings of various lengths and patterns, proper names of brands or models, version numbers, etc.). Furthermore, even when the customer does know this information, technical limitations may make it difficult to accurately and easily convey this information to the contact center when contacting the company for support, due to the complex and arbitrary format of the product identifier. Relatedly, the customer may not have sufficient information to identify the issue with the product, as the customer may not understand the current state of the product or the error codes being displaying. Thus, even after the customer is connected to an agent, the agent may not have the right skill set to resolve the issue, or the agent may not have sufficient information to present to the customer additional cross-sell or up-sell opportunities. These situations may create poor usability, high effort and low satisfaction for the customer, as well as inefficiency, high cost-to-serve, and diminished incremental revenue potential for the company or enterprise.

A connected-machine initiated routing, like that described in more detail below, may allow a contact center to use an event associated with a connected-machine to determine the appropriate resources for handling a communications session between a user and an agent before the communications session starts. For example, based on event data received from a connected-machine, a contact center may identify the connected-machine and the associated event, and may determine a routing decision to route a customer's call to one of the agents that have the appropriate skills to resolve the issues related to the event. Moreover, based on the event data, the contact center may generate a personalized greeting that is associated with both the customer and the event generated by the connected-machine. In doing so, several advantages may be achieved. First, the reduced agent or technician time required to identify the product may save costs for the company. Second, the user experience with a contact center may improve because when the customer calls the contact center, the call will be automatically routed to an agent that is skilled to resolve the issues related to the event without additional customer inputs. Third, a higher first contact resolution (FCR), improved sales closure rates, decreased transfers, and fewer repeat calls may be achieved by being able to get the customer interaction to the best skilled agent per product specialization. Fourth, the enterprise may benefit from improved customer satisfaction as well as the potential to capture cross-sell or up-sell opportunities. Fifth, pre-registered device profile data allows services to be delivered "just in time" to the customer service and/or sales operations, enabling the owner of the enterprise product to reduce the amount of time necessary to identify the product in need of service and/or sales.

However, even if a contact center may be configured to determine a routing decision based on an event associated with a connected-machine, the contact center still may not be configured to process many different protocols across the many different types of connected-machines to process the users' demands effectively. Moreover, a means to proactively and dynamically interact with the customer is also desirable to complement the connected-machine initiated routing capability. A digital service interface, like that described in more detail below, may act as an automated concierge at the customer's end to proactively inform the customer about events associated with connected-machines, and to facilitate communications among one or more connected-machines, the customer, and the contact center. For example, when an enterprise product is installed, the digital service interface may be delivered alongside and may be set-up to register information about the enterprise product (e.g., model number, serial number, machine name, owner name, etc.) with the contact center. Alternatively, a downloadable application may be downloaded onto a mobile device, and the product information could be registered through this mobile application.

The digital service interface is connected to the customer service environment (and thus can ascertain resource availability, skill, skill level, service and/or sales priority, estimated wait times, etc.) of a contact center, and can be configured to provide relevant service and/or sales options (e.g. service/sales need, priority, channel choice, phone number, call back, service appointment, etc.) for the customer back through its display. Lastly, the digital service interface could also be set up and configured for a product that has previously been purchased/deployed. This allows the digital service interface to support a much larger addressable market than alternative approaches that are currently available. In doing so, several additional advantages may be achieved. First, the user experience with a contact center may further improve because issues associated with an event may be resolved in a timely and effective manner. Second, revenue for the company may improve due to higher cross-/up-sell opportunities that could be delivered through the digital service interface associated with a particular product. Third, the addressable market may increase, since the digital service interface can be used not only to support new products, but also can be applied to existing products that have already been sold/deployed into the market. Fourth, a physical and intelligent representative of the product that is separate from the product itself may be enabled, which ensures a robust representative that can maintain continuity when the product loses communications with the network.

This service/method thus enables the deployment of interaction-enabled solutions between communications devices and a contact center. In some implementations, the service/method enables users to interact with a multi-channel application. The application is referred to as multi-channel in that it enables users to contact and interact with a multi-channel interaction platform via any of multiple different communications channels (e.g., phone, email, chat, Short Message Service (SMS), or another communications channel that supports communications between the user and the interaction site). For example, the user may contact the multi-channel platform (e.g., by phone) and provide information to the multi-channel platform by speaking and may receive information from the multi-channel platform by hearing. Alternatively, the user may instead choose to contact the multi-channel platform (e.g., by SMS, chat room, or email) and provide the same information to the multi-channel platform by typing text and receive the same information from the multi-channel platform by reading text. Alternatively, the user may instead choose to contact the multi-channel platform by video. The video may be interactive (e.g., with an agent), or pre-recorded (e.g., a video demonstrating how to fix malfunctioning device or a sales/marketing video). In some implementations, the user may contact the multi-channel platform using bundled channels. For example, the user may use a combination of text and voice to communicate with the multi-channel platform. In some implementations, channels may be switched during a communications session. For example, a request to communicate with the multi-channel platform may be made by an email, and a response for establishing the communications session may be made by voice.

FIG. 1 is a block diagram of a communications system 100 that provides interactions among a user device 110, a contact center 102, and one or more registered devices 130-1 to 130-n to resolve events associated with the one or more register devices 130-1 to 130-n. The term interaction is used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like. The communications system 100 includes a user device 110, a communications network 120, a contact center 102, a web server 122, one or more registered devices 130-1 to 130-n, and a digital service interface 140.

Customers, potential customers, employees, staff, students, members of an organization, patients of a healthcare system, citizens interacting with a government agency, or other end users (collectively referred to as customers) desiring to request services and/or sales from the contact center 102 may initiate a communications session through any one available channel of the multiple channels via a user device 110. The service may be, for example, a request to service a defective product. The user device 110 may be a communications device conventional in the art, such as, for example, a telephone, wireless phone, smart phone, personal computer, electronic tablet, a wearable device, an implanted device, and/or the like. The user device 110 may also be a computer that includes one or more software or hardware applications for performing communications between the user device 110 and the contact center 102. The user device 110 may have various input/output devices with which a user may interact to provide and receive audio, text, video, and other forms of data. A user operating the user device 110 may initiate, manage, and respond to telephone calls, emails, chats, text messaging, web-browsing sessions, and other multi-media transactions. As an example, a customer may make a telephony call by inputting, via manual selection or otherwise, a telephone number associated with the contact center into the user device 110 to contact the contact center 102. Additionally or alternatively, the user may indicate a desire to request a service from the contact center by selecting a graphically displayed icon on a graphical user interface (GUI) of the user device 110 to thereby invoke an application stored in the user device 110 with which the user can interact to initiate a service and/or sales request. Additionally or alternatively, the user may indicate a desire to request a service and/or sales by inputting and sending, via manual selection or otherwise, a SMS message that includes a short code and a keyword associated with the contact center into the user device 110. Additionally or alternatively, the user may indicate a desire to request a service and/or sales by inputting, via manual selection or otherwise, a uniform resource locator (URL) associated with the contact center into the user device 110 to initiate a chat session with the customer service and/or sales department. Additionally or alternatively, the user may indicate a desire to request a service and/or sales by inputting and sending, via manual selection or otherwise, an email that includes an email address associated with the contact center into the user device 110. Additionally or alternatively, the user may indicate a desire to request a service and/or sales via a communications channel not listed in the above examples.

Inbound and outbound telephony calls from and to the user device 110 may traverse a telephone, cellular, and/or data communications network 120 depending on the type of device that is being used. For example, the communications network 120 may include a private or public switched telephone network (PSTN), local area network (LAN), private wide area network (WAN), Integrated Services Digital Network (ISDN), Digital Subscriber Line (xDSL), radio, television, cable, satellite, a public wide area network such as the Internet, and/or any other delivery or tunneling mechanism for carrying data. The communications network 120 may also include a packet-switched data network based on the Internet protocol (IP) or asynchronous transfer mode (ATM), and may support voice using, for example, Voice-over-IP, Voice-over-ATM, or other comparable protocols used for voice data communications. The communications network 120 may also include a wireless carrier network including a code division multiple access (CDMA) network, global system for mobile communications (GSM) network, or any wireless network/technology conventional in the art, including but to limited to 3G, 4G, LTE, and the like.

In general, the contact center 102 manages resources (e.g. agents, computers, and telecommunication equipment) to enable delivery of services via telephone or other communication mechanisms. Such services may vary depending on the type of contact center, and may range from customer service to help desk, emergency response, telemarketing, order taking, and the like. In some implementations, the contact center 102 may be an in-house facility to an enterprise (e.g., a business or corporation) for serving the enterprise in performing the functions of sales and service relative to the products and services available through the enterprise. In some other implementations, the contact center 102 may be a third-party service provider that hosts the functions for an enterprise. The contact center 102 may be deployed in equipment dedicated to the enterprise or third-party service provider, and/or deployed in a remote computing environment such as, for example, a private or public cloud environment with infrastructure for supporting multiple contact centers for multiple enterprises. In some implementations, the various components of the contact center 102 may be centralized in a single computing environment and may be interconnected by a local area network 162. In some other implementations, the various components of the contact center 102 may be distributed across various geographic locations and computing environments and not necessarily contained in a single location, computing environment, or even computing device. The contact center 102 may include a switch/media gateway 104, an interactive media response (IMR) server 106, a communication server 108, a routing server 112, a statistics server 114, a reporting server 116, an interaction (iXn) server 152, a contact center database 154, one or more agent devices 156-1 to 156-k, an event server 158, and a recommendation server 160.

The switch/media gateway 104 is coupled to the communications network 120 for receiving and transmitting telephony calls between end users and the contact center 102. In some implementations, the switch/media gateway 104 may include a telephony switch configured to function as a central switch for agent level routing within the contact center. The telephony switch may be a hardware switching system or a soft switch implemented via software. For example, the switch/media gateway 104 may include an automatic call distributor, a private branch exchange (PBX), an IP-based software switch, and/or any other switch with specialized hardware and software configured to receive Internet-sourced calls and/or telephone network-sourced calls from a customer, and route those calls to, for example, an agent device. The switch/media gateway 104 may establish a communications session between the calling customer and the agent device, by establishing, for example, a telephony connection between the user device 110 and one of the agent devices 156-1 to 156-k. The switch/media gateway 104 may also include an inbound call queue, an outbound call request queue, an automatic call distributor ("ACD") administrator, and/or contact information of a plurality of agents associated with the agent devices 156-1 to 156-k.

The communication server 108 is coupled to the switch/media gateway 104, and in general serves as an interface between the switch/media gateway 104 and the remainder of the routing, monitoring, and other call-handling components of the contact center 102. The communication server 108 may be configured to process PSTN calls, VoIP calls, and the like. For example, the communication server 108 may be configured with computer-telephony integration (CTI) software for interfacing with the switch/media gateway 104 and contact center equipment. In some implementations, the communication server 108 may include a session initiation protocol (SIP) server for processing SIP calls. In some implementations, the communication server 108 may extract data about the customer interaction such as the caller's telephone number, often known as the automatic number identification (ANI) number, or the customer's internet protocol (IP) address, or email address, or location data, or environmental data (e.g., temperature, humidity, time of day, time-zone of device/product, etc.), and communicate with other contact center components such as the routing server 112 in processing the call.

The interactive media response (IMR) server 106 may be referred to as a self-help system, virtual assistant, or the like. The IMR server 106 may be similar to an interactive voice response (IVR) server, except that the IMR server 106 is not restricted to voice, but may cover a variety of media channels including voice. Taking voice as an example, however, the IMR server 106 may be configured with an IMR script for querying calling customers on their needs. For example, a contact center for a bank may tell callers, via the IMR script, to "press 1" if they wish to get an account balance. The IMR script may be written in a scripting language such as, for example, voice extensible markup language (VoiceXML) or speech application language tags (SALT). Through continued interaction with the IMR, customers may complete service and/or sales without needing to speak with an agent. The IMR server 106 may also ask an open ended question such as, for example, "How can I help you?" and the customer may speak or otherwise enter a reason for contacting the contact center. The customer's response may then be used by the routing server 112 to route the call to an appropriate contact center resource.

In some implementations, the IMR server 106 may additionally include a SMS handling system configured to handle a request to interact with a contact center using a SMS channel. The SMS handling system may receive user SMS messages from or place SMS messages to communications devices, such as the user device 110, and respond to the SMS messages in accordance with a SMS program. The SMS program may be a script written in a scripting language such as, for example, extensible markup language (XML). In some implementations, the IMR server 106 may additionally include an email handling system configured to handle a request to interact with a contact center using an email channel. The email handling system may receive user emails from or place emails to communications devices, such as the user device 110, and respond to the emails in accordance with an email program. The email program may be a script written in a scripting language such as, for example, extensible markup language (XML). In some implementations, the IMR server 106 may additionally include a chat handling system configured to handle a request to interact with a contact center using a chat channel. The chat handling system may receive user message from or places messages in a chat session to communications devices, such as the user device 110, and respond to the messages in accordance with a chat program. The chat program may be a script written in a scripting language such as, for example, extensible markup language (XML).

The routing server 112 is configured to interact with the communication server 108 to select an appropriate agent for processing the call if a call is to be routed to an agent. Each agent may be assigned to one of the agent devices 156-1 to 156-k, where k is an integer. The selection of an appropriate agent for routing an inbound call may be based, for example, on a combination of routing strategies employed by the routing server 112, and further based on information about agent availability, skills, agent performance metrics, information known about the inbound or outbound call, and other routing parameters provided, for example, by a statistics server 114. For example, a routing strategy may be based on a data-driven strategy, where customer information related to existing back-end data (e.g., purchase history, or collected IVR data) may be used to determine a routing decision. As another example, a routing strategy may be based on a business priority routing strategy, where the routing server 112 may query a contact center database 154 to retrieve business information such as contact information and service level agreement (SLA) requirements associated with the caller to determine a routing decision. As another example, a routing strategy may be based on a revenue-based routing, where the revenue potential of a caller is used to determine a routing decision. As another example, a routing strategy may be based on a least cost routing, where the cost for an enterprise to establish a communications session is used to determine a routing decision. As another example, a routing strategy may be based on a last agent routing, where an identity of a caller may be identified through information such as the ANI number, and previous agent interactions with the caller is used to determine a routing decision. As another example, a routing strategy may be based on agent profile and skills based routing, where resource requirements for handling the call is used to determine a routing decision. Any other routing strategies not described here may also be used to determine a routing decision. Once an identified agent is available to handle a call, the communication server 108 may establish a connection between the user device 110 and the agent device of the identified agent. In some implementations, collected information about the caller (e.g. via interactions with the IMR server 106) and/or the caller's historical information may also be provided to the agent device for aiding the agent in better servicing the call.

Each agent device of the agent device 156-1 to 156-k may include a telephone adapted for regular telephone calls, VoIP calls, and the like. The agent device 156-1 to 156-k may also include a computer for communicating with one or more servers of the contact center 102 and performing data processing associated with contact center operations, and for interfacing with customers via voice and other multimedia communication mechanisms. In some implementations, in addition to real-time interactions, deferrable (also referred to as back-office or offline) interactions/activities may also be routed to the contact center agents. Such deferrable activities may include, for example, responding to emails, responding to letters, or any other activity that does not entail real-time communication with a customer. The interaction (iXn) server 152 may be configured to interact with the routing server 112 for selecting an appropriate agent to handle the deferrable activity. Once assigned to an agent, the iXn server 152 may push the activity to the agent, where the activity may appear in the agent's device as a task to be completed by the agent.

In general, the contact center database 154 may store one or more databases relating to agent data (e.g. agent profiles, skills, schedules, etc.), business rule data (e.g. customer profiles, service level agreement, etc.), interaction data (e.g. details of each interaction with a customer, including reason for the interaction, disposition data, time on hold, handle time, etc.), registered device profile data (e.g., serial numbers of registered device, model numbers of registered devices, etc.), and the like. In some implementations, some of the data may be maintained in a customer relations management (CRM) database hosted at a remote location. The contact center database 154 may take form of a hard disk or disk array as is conventional in the art, and may be implemented using for example, Cassandra or any NoSQL database. The contact center database 154 may also be a SQL database and may be managed by any database management system such as, for example, Oracle, IBM DB2, Microsoft SQL server, Microsoft Access, PostgreSQL, MySQL, FoxPro, and SQLite. The contact center database 154 may provide data in response to a query from a contact center component. For example, the routing server 112 may query customer information from the contact center database 154 based on an ANI number or other information collected by the IMR server 106.

The statistics server 114 is configured to collect and aggregate statistics associated with the contact center 102, such as, for example, average waiting time, abandonment rate, agent occupancy, and the like. The reporting server 116 is configured to generate reports from data aggregated by the statistics server 114. Such reports may include near real-time reports or historical reports concerning the state of resources. The reports may be generated automatically or in response to specific requests from a requestor (e.g. agent/administrator, contact center application, and/or the like).

In general, the event server 158 is configured to determine, based on data representing an event associated with a registered device, actions for assisting a customer to resolve the event. The data representing an event associated with a registered device may be received via the switch/media gateway 104 or another media gateway. For example, after the switch/media gateway 104 receives the data representing an event associated with a registered device, the switch/media gateway 104 may work with the iXn server 152 to forward the data to the event server 158 based on a business rule. In some implementations, the event server 158 may interact with the routing server 112 and/or the contact center database 154 to select one or more agents that are appropriate for handling the request to resolve the event based on the event data, agent availability, agent skills, agent performance metrics, and other suitable parameters. In some implementations, after selecting the appropriate agents, the event server 158 may interact with the iXn server 152 to determine contact information for establishing a communications session between the user device 110 and the selected agent device. For example, the contact information may be a reserved telephone number, such that when the user calls the contact center using the reserved telephone number, the call can be routed directly to the selected agent device.

In some implementations, after selecting the appropriate agents, the event server 158 may interact with the communication server 108 to place a call in the outbound queue to proactively reach the customer. For example, upon learning that a registered device (e.g., an enterprise server) has failed, the event server 158 may allocate the necessary resources (e.g., agent and information needed to handle the issue) and then interacts with the communication server 108 to place a call to the customer notifying the issue.

In some implementations, the event server 158 may be configured to dynamically generate a message for the customer that is uniquely associated with the registered device and the associated event. For example, upon learning that a water filter of a refrigerator needs to be replaced, the event server 158 may generate a message "Thank you for calling the enterprise. Your refrigerator informed us that your water filter needs to be replaced. Are you calling to order a new water filter?" that is to be presented to the customer. The dynamically generated message may be added to an automated phone script, where the automated phone script will be played based on the ANI or other identifying information of the caller.

The recommendation server 160 is configured to determine one or more recommendations for a customer based on the event data and data associated with the customer that is stored in the contact center database 154. The recommendations may include up-sell or cross-sell opportunities. For example, if an enterprise server has been experiencing elevated temperatures in a data center, based on data and business rules stored in the contact center database 154, the recommendation server 160 may identify a data-center temperature management solution that the enterprise has recently released, so that the agent may timely present this solution to the customer during the communications session. As another example, the recommendation server 160 may identify a product that directly related to the registered device, such as a replacement filter for a refrigerator or HVAC system. As another example, the recommendation server 160 may identify another product and/or service that is outside of the scope of the registered device, as such a similar product that other customers have purchased. In some implementations, the recommendation server 160 may push a recommendation to an agent device, such that the agent of the agent device may proactively contact the customer on the recommendation at a later time.

The registered devices 130-1 to 130-n are connected-machines that have been registered with the companies that have manufactured or have been contracted to service these devices or products. A registered device (e.g., 130-1) may be a household appliance (e.g., a smart refrigerator), an enterprise product (e.g., an enterprise server), a consumer electronics product (e.g., a smart watch), a communications device (e.g., user device 110), or any other suitable products. The companies may service these registered products using the contact center 102. Each of the registered devices 130-1 to 130-n, where n is any integer, may be a connected-machine that is embedded with electronics, software, sensors, and/or network connectivity to enable the registered device collect and exchange data with another registered device 130-1 to 130-n, the digital service interface 140, the user device 110, and/or or the contact center 102. The inter-connections among the registered devices 130-1 to 130-n and other devices, systems, and apparatuses may sometimes be termed collectively as the "Internet of things" (IoT). In some implementations, a registered device may communicate with another device via the communications network 120. For example, the registered device 130-n may communicate with the contact center 102 via the communications network 120. In some implementations, a registered device may communicate with another device directly. For example, the registered device 130-n may communicate with the registered device 130-1 and/or the user device 110 directly via the Bluetooth standard, the Message Queuing Telemetry Transport (MQTT) protocol, the Constrained Application Protocol (CoAP) protocol, or any other suitable device-to-device communications protocol. In some implementations, a registered device may communicate with another device via the digital service interface 140. For example, the registered device 130-1 may communicate with the contact center 102 and/or the user device 110 via the digital service interface 140. The data transmitted by the registered devices 130-1 to 130-n may include an identification of the registered device, a state of the registered device, a time-stamp associated with an event, data generated by sensors embedded in the registered device, or any other applicable data. The data communicated by the registered devices 130-1 to 130-n may be encoded in one or more protocols that may be public or proprietary to an enterprise.

In general, the digital service interface 140 provides a communications interface for the user device 110, the registered devices 130-1 to 130-n, and the contact center 102. In some implementations, the digital service interface 140 may be embedded in a registered device. For example, the digital service interface 140 may be integrated to a smart home appliance that is a registered device. In some other implementations, the digital service interface 140 may be a device that is peripheral to a registered device. For example, the digital service interface 140 may be implemented on a single-board computer (e.g., Raspberry Pi) that co-locates with a rack of enterprise servers that are registered devices. In some other implementations, the digital service interface 140 may be an external digital device that is not co-located with a registered device. For example, the digital service interface 140 may be installed as a downloadable application that is running on the user device 110.

The digital service interface 140 includes a communications interface 142 and a registered device profile store 144. The communications interface 142 may include input means (e.g., keyboard, touch-screen, microphone, data receiver, barcode reader, scanner, and/or any other suitable input means) and output means (e.g., display, speakers, LED indicators, data transmitter, and/or any other suitable output means). In some implementations, the communications interface 142 may be configured to receive data from the user device 110, the registered devices 130-1 to 130-n, and/or the contact center 102. For example, the communications interface 142 may receive an indication from a registered device that the registered device is malfunctioning. In some implementations, the communications interface 142 may be configured to transmit data to the user device 110, the registered devices 130-1 to 130-n, and/or the contact center 102. For example, in response to receiving an indication from a registered device that the registered device is malfunctioning, the communications interface 142 may transmit event data to the contact center 102 to initiate a connected-machine-initiated routing for a communications session between the user device 110 and an agent device.

In some implementations, the communications interface 142 may be configured to convert data from a first data format to a second data format. For example, the communications interface 142 may receive data from a registered device, where the data may be formatted in a proprietary format that is used by the enterprise. The communications interface 142 may convert the received data into a second data format that can be stored in the contact center database 154 before transmitting the data to the contact center 102.

In some implementations, the communications interface 142 may be configured to communicate data using multiple communication protocols. For example, the communications interface 142 may be configured to communicate with a registered device using Bluetooth communication protocol, and the communications interface 142 may be configured to communicate with the contact center 102 using the Hypertext Transfer Protocol (HTTP) protocol.

In some implementations, the communications interface 142 may be configured to probe a state of a registered device. For example, the communications interface 142 may send a ping message to an enterprise server at a predetermined frequency (e.g., once an hour) to determine that the server is still alive. In the case that the server does not respond to the ping message, the communications interface 142 may send event data to the contact center indicating a potential failure of the server.

The registered device profile store 144 is configured to store profile information associated with one or more registered devices of the registered devices 130-1 to 130-n. In general, data sent from a registered device may include limited identification information about the registered device such as a hardware address of the registered device. Based on the received identification information, the digital service interface 140 may access the registered device profile store 144 to retrieve more information about the registered device such as the model number, the serial number, the date of purchase, any service plan associated with the registered device, customer contact information, event history of the registered device, and/or any other contextual information. The digital service interface 140 may then present the retrieved information or send the retrieved information to the contact center 102 and/or the user device 110.

In some implementations, the digital service interface 140 may be configured to receive an indication of an event from one or more of the registered device 130-1 to 130-n. In response to receiving the indication, the digital service interface 140 contacts the contact center 102 to obtain contact information that a user may use to contact the contact center 102. As an example described in more details below in reference to FIG. 3, a smart refrigerator may send an indication to the digital service interface 140 alerting on a need for a water filter replacement. In response to receiving the indication from the server, the digital service interface 140 may transmit event data that includes an identification and a state of the registered device to the contact center 102. After receiving the reserved contact information from the contact center 102, the digital service interface 140 may present the reserved contact information to a user such that the user may use the user device 110 to establish a communications session between the user device 110 and the contact center 102.

In some implementations, the digital service interface 140 may be configured to contact the contact center 102 without receiving an indication of an event from one or more of the registered device 130-1 to 130-n. For example, a server may go offline and cannot provide further communications with the digital service interface 140. In response to determining that the server has not responded to ping messages sent by the digital service interface 140 over a predetermined period of time, the digital service interface 140 may transmit event data that includes an identification and a state of the registered device to the contact center 102.

In some implementations, the digital service interface 140 may be configured to contact the user device 110 before contacting the contact server 102. For example, based on information stored in the registered device profile store 144, the digital service interface 140 may determine that a service call is due for a HVAC system. The digital service interface 140 may present or send a message to the user notifying a need to schedule the service call, where the message may include contact information for contacting the contact center 102 and/or information related to the HVAC system such as the serial number and the current state of the HVAC system.

In some implementations, after the communications session between the user device 110 and an agent device (e.g., 156-1) has been established, the digital service interface 140 may be configured to provide the contact center 102 further information on the registered device. For example, after a communications session between the user device 110 and an agent device 156-1 to fix a malfunctioning server has been established, the agent may wish to obtain a current temperature sensor reading of the server. The agent may use the agent device to send a request to the digital service interface 140. In response to receiving the request, the digital service interface 140 may communicate with the server to obtain the current temperature sensor reading of the server. After the digital service interface 140 obtains the current temperature sensor reading of the server, the digital service interface 140 then sends the agent device 156-1 a message reporting the current temperature sensor reading to help the agent to further assist the user.

The web servers 122 may include, for example, social interaction site hosts for a variety of known social interaction sites to which an end user may subscribe, such as, for example, Facebook, Twitter, and the like. The web servers 122 may also provide web pages for the enterprise that is being supported by the contact center 102. For example, end users may browse web pages and get information about the enterprise's products and services. The web pages may also provide a mechanism for contacting the contact center 102, via, for example, web chat, voice call, email, web real time communication (WebRTC), or the like.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

Figure 2:
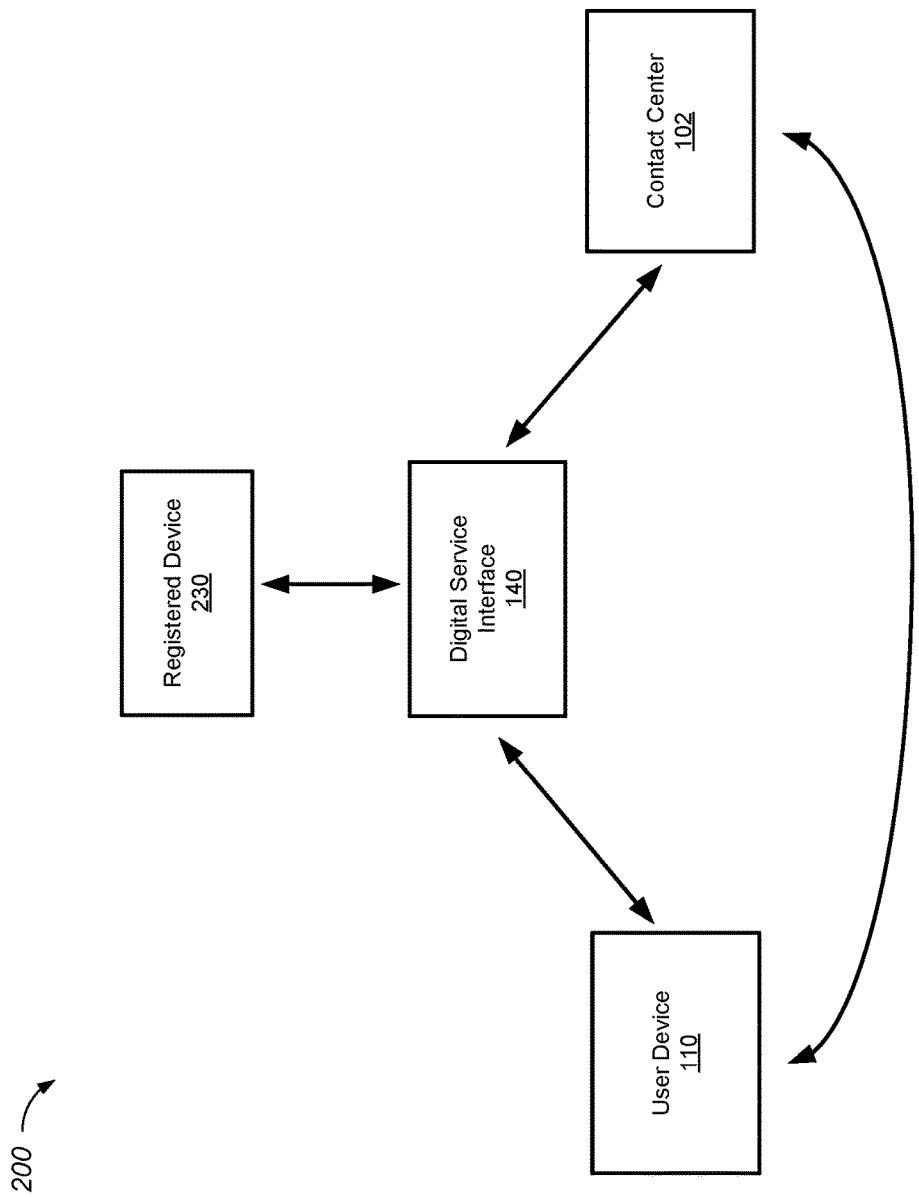
FIG. 2 is a block diagram of a communications system that illustrates a standalone digital service interface providing interactions among a user device, a contact center, and a registered device.

FIG. 2 is a block diagram of a communications system 200 that illustrates a stand-alone digital service interface 140 providing interactions among a user device 110, a contact center 102, and a registered device 230. A use case scenario is described below to provide an example of the interactions among the user device 110, the contact center 102, and the registered device 230.

A customer, XYZ Corporation, has purchased several racks of enterprise servers in its data centers. One of these servers is the registered device 230, and a technical engineer is assigned to monitor these servers. Attached to or nearby each server is a digital service interface 140 in the form of a peripheral digital display device, where information about the server and its environment can be conveyed back to the contact center 102. For example, the digital service interface 140 may be implemented on a single-board computer (e.g., RaspberryPi) or a smart device such as a tablet. The contact center 102 may be a third-party service provider that performs the functions of servicing the servers for the enterprise. The digital service interface 140 has been preconfigured to store unique product identifying information of the registered device 230 (e.g., the enterprise server's serial number), so there is an association between the registered device 230 and the digital service interface 140.

The registered device 230 may have sensors that allow it to collect information about the surrounding environment (such as temperature, humidity, etc.). In this example, the registered device 230 has experienced over-heating and has started to malfunction. The temperature sensor of the registered device 230 detects that the surrounding temperature has exceeded a threshold, and in response, the registered device 230 may transmit an indication to the digital service interface 140 alerting on the temperature increase.

The contact center 102 may store data and business rules which evaluate how to respond to this type of situation. Based on the received event data from the digital service interface 140 and/or the registered device profiles stored in the contact center database 154, the contact center 102 may determine that (i) the server is a registered device, (ii) the surrounding temperature associated with one of its servers is dangerously high; (iii) this alert is associated with the registered device 230, which is one of the most expensive servers that the enterprise makes; and (iv) this particular machine was purchased by XYZ Corporation, which is one of enterprise's largest and most important customers. Based on the business rules and the event, the contact center 102 determines the agents that are qualified to service the XYZ Corporation, and proactively contacts the XYZ Corporation to inform them of the situation. Specifically, an SMS message containing a text-based intelligent service prompt may be sent to the user device 110 to alert a user (i.e., the technical engineer) of the user device 110 of the situation. In response to receiving the SMS message on the user device 110, the technical engineer can go into the data center and identify the registered device 230 that is overheating and malfunctioning. In some implementations, the digital service interface 140 attached next to the registered device 230 also displays the temperature warning, so it would be easy to identify the malfunctioning server.

In addition, the digital service interface 140 may provide channel options that the technical engineer can select from, using a touch display screen of the digital service interface 140. These channel options may be derived based on data and business rules stored in the contact center 102. For example, the channel options offered may be based on (but not limited to) factors such as (i) the value of the customer (e.g., XYZ Corporation is a high-value customer), where some channel options (e.g., video) are reserved for only the high value customers; (ii) the product value and whether or not it's mission critical (e.g., the registered device 230 is a costly and critical machine); (iii) other products that the same customer may have also purchased (e.g., the contact center 102 may determine that XYZ corporation has purchased more than one version of this product to support Disaster Recovery/Business Continuity mode for the enterprise servers); the type of event or alert (e.g., the surrounding temperature reading was hot enough to suggest that the machine may have trouble functioning); and (v) skilled resource availability within contact center 102 to support the channel options (e.g., video channel will not be offered if all video-enabled agents are currently busy).

Driven by these data and business rules, the display of the digital service interface 140 offers the technical engineer a range of tailored contact channel options that may include contact information to the contact center 102—e.g., (1) Receive a callback, (2) Initiate a chat, (3) Have a video interaction, etc. The technical engineer may select the video option, and may be immediately connected to an agent device of the contact center 102, where the agent specializes in the model of the registered device 230. The agent receiving this video interaction may receive a screen-pop with all of the associated information about this customer, product, events and alerts, etc. Thus, the agent is able to walk the technical engineer through the diagnostic steps to troubleshoot the registered device 230 and get it working properly again.

Moreover, based on data and business rules stored in the contact center 102, the recommendation server 160 of the contact center 102 may determine one or more up-sell/cross-sell opportunities that the agent may present to the technical engineer during the communications session. For example, based on the data that XYZ Corporation is a high-value customer and that the registered device 230 is experiencing an increase in the surrounding temperature, the recommendation server 160 may identify a data-center temperature management solution that the enterprise has recently released, so that the agent may timely present this solution to the technical engineer.

Figure 3:
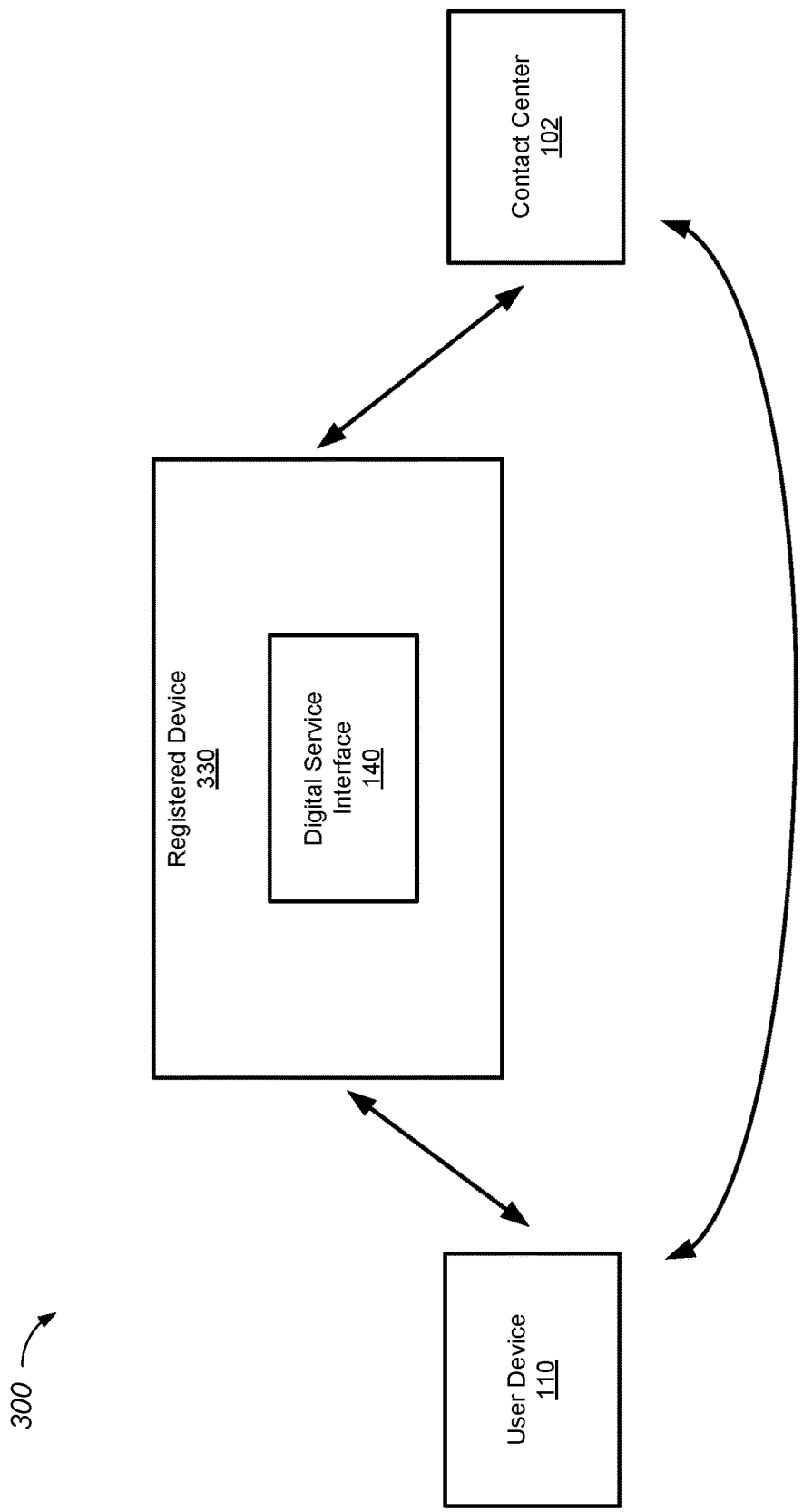
FIG. 3 is a block diagram of a communications system that illustrates a digital service interface embedded in a registered device to provide interactions among a user device, a contact center, and the registered device.

FIG. 3 is a block diagram of a communications system 300 that illustrates a digital service interface 140 embedded in a registered device 330, where the digital service interface 140 provides interactions among a user device 110, a contact center 102, and the registered device 330. A use case scenario is described below to provide an example of the interactions among the user device 110, the contact center 102, and the registered device 330.

In this example, the customer has bought a registered device 330, which is a smart refrigerator having embedded sensors and an embedded digital service interface 140 that includes a digital display on the front surface of the refrigerator. Information about the registered device 330 may be signaled to the contact center 102, which may be an in-house facility to an enterprise for performing the functions of sales and service relative to the smart refrigerator. Through one of the embedded sensors, the registered device 330 determines that the water filter of the refrigerator needs to be replaced, and in response, the embedded digital service interface 140 communicates event data to the contact center 102, where the event data may include a serial number of the registered device 330 and an indication that the water filter needs to be replaced. Based on the event data, an event server 158 of the contact center 102 may determine the most appropriate agents for handling this event, and the contact center 102 may dynamically generate a phone number that is uniquely associated with the registered device 330 and the associated event. In addition, the event server 158 may dynamically generate a message for the customer that is uniquely associated with that the registered device 330 and the associated event. The contact center 102 may then transmit contact information including the dynamically generated phone number to the digital service interface 140. In response to receiving the contact information, the embedded digital service interface 140 may present the dynamically generated phone number on the built-in digital display.

In this example, the customer notices that the built-in digital display on the front of the refrigerator displayed an alert: "Water filter needs to be replaced. To order new filter, call [the generated phone number]." The customer calls the contact center 102 using the displayed number. Based on the DNIS number of the dynamically generated phone number that the customer call, the contact center 102 is able to determine, not only which model of the registered device 330 the customer owns, but also the event associated with the call. An automated phone script may answer the call with the dynamically generated message: "Thank you for calling the enterprise. Your refrigerator informed us that your water filter needs to be replaced. Are you calling to order a new water filter?"

After answering "yes," the customer is routed directly to an agent that is a specialist of the registered device 330. In addition, prior to the call, the iXn server of the contact center 102 may have already transmitted information related to the event, such that the agent receiving this call knows the purpose of the customer's call without additional customer input.

Figure 4:
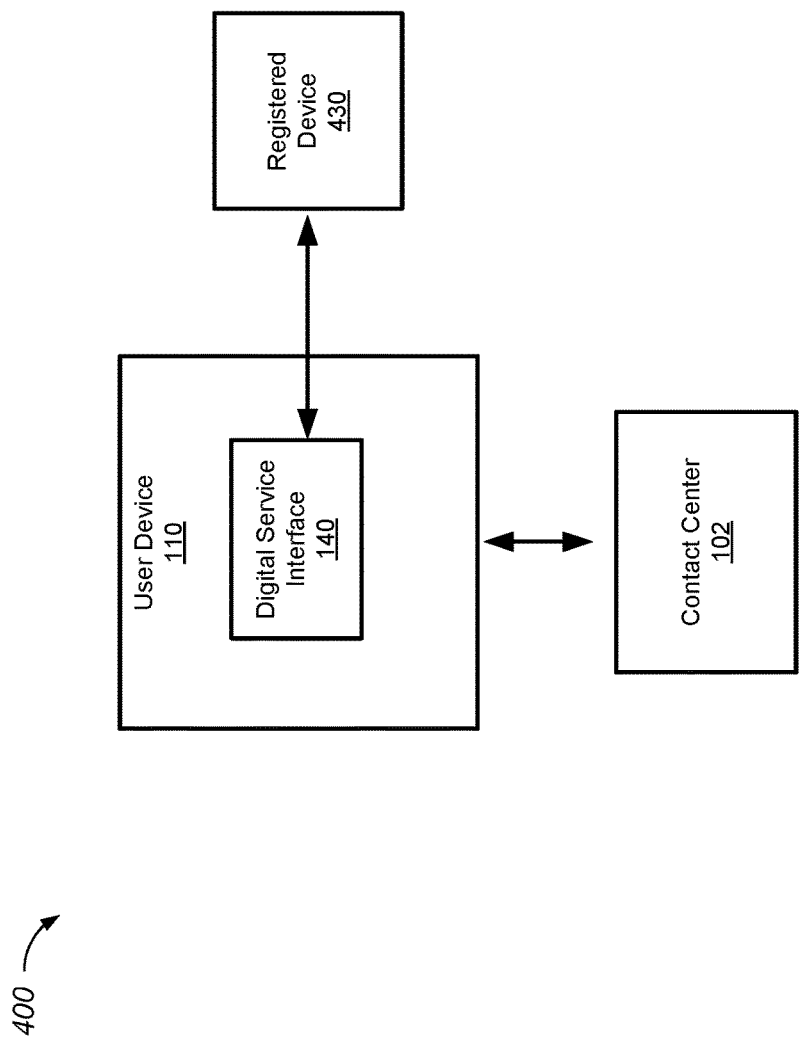
FIG. 4 is a block diagram of a communications system that illustrates a digital service interface being installed as an application running on a user device to provide interactions among the user device, a contact center, and a registered device.

FIG. 4 is a block diagram of a communications system 400 that illustrates a digital service interface 140 being installed as an application running on a user device 110, where the digital service interface 140 provides interactions among the user device 110, a contact center 102, and a registered device 430. A use case scenario is described below to provide an example of the interactions among the user device 110, the contact center 102, and the registered device 430.

In this example, the customer purchased from an enterprise the registered device 430, which is a new HVAC system. The customer also purchased an extended warranty plan for the registered device 430 from the enterprise, which entitles the customer to free services calls every six months. After a technician from the enterprise installed the HVAC system, the customer downloaded an application that runs as the digital service interface 140 for the registered device 430. Using the touchscreen display on the user device 110, the technician helped the customer to enter the product identifying information (e.g., the serial number) of the registered device 430 in the digital service interface 140, so that the digital service interface 140 would be uniquely associated with the registered device 430. The technician also entered the customer's contact phone number in the digital service interface 140, so that the enterprise would have this contact information as part of its customer records stored in the contact center database 154. In addition, the digital service interface 140 may store information related to the customer's extended warranty plan.

After six months, the digital service interface 140 identifies that a service is due. The digital service interface 140 communicates, using a first protocol, with the registered device 430 to determine whether any components of the registered device 430 has failed. The digital service interface 140 then communicates, using a second protocol, with the contact center 102 to transmit event data that includes the identification of the registered device 430, an indication that service is due for the registered device 430, and an indication that no component has failed. In response to receive the event data, an event server 158 of the contact center 102 may determine that the most appropriate way to handle this event is to use a visual IVR application instead of using an agent. In a visual IVR, scripts that are pre-programmed for a voice-based IVR may be translated by an application server into a different programming or scripting language (e.g., HTML5) such that the translated scripts may be visually presented to the user using a client-side application running on the user device 110. The visual IVR interacts with the user by using visual commands to prompt the user to provide information and enabling the user to input the information by entering text and numbers using the user device 110. The information may then be processed by the IMR server 106 of the contact center 102. In addition, the event server 158 may dynamically generate a message for the customer that is uniquely associated with that the registered device 430 and the associated event.

The contact center 102 then places an outbound call to the customer. The intelligent automated audio prompt plays the dynamically generated message: "Hello, this is HVAC enterprise calling with an important message about your registered device 430. As part of your extended warranty plan, you are entitled to a free six-month check up by one of our service technicians. Please use the digital service interface to schedule your service call."

The customer may then open the application to execute the digital service interface 104 on the user device 110. The display of the user device 110 presents the customer with a "Visual IVR" of menu options: "Menu: (1) Schedule Checkup Service Call; (2) Report HVAC Problem; (3) Order Filter; (4) Other." In this example, the customer selects option (1), where the digital display then provides the customer the options for the days and times to schedule the service call. The user's feedback is provided to the contact center 102, where the IMR server 106 processes the feedback to schedule the service call. The customer's experience has thus improved because the enterprise has proactively contacted him with the six-month service reminder, and that it was easy to schedule the service call using the application running on the user device 110.

Figure 5:
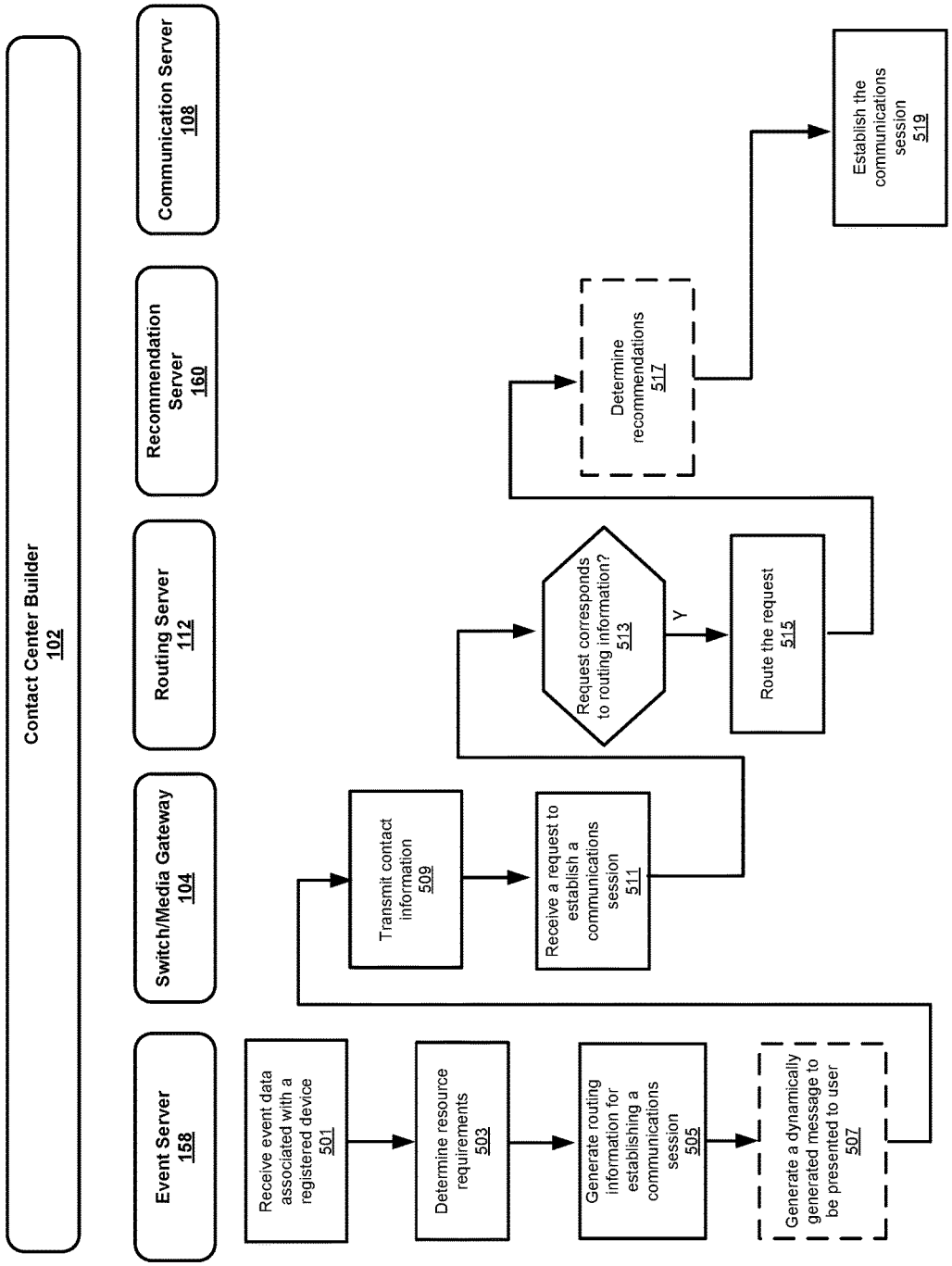
FIG. 5 is a flow chart illustrating an example of a process for a contact center to determine routing information for establishing a communications session between a user device and an agent device based on an event associated with a registered device.

FIG. 5 is a flow chart illustrating an example of a process 500 for a contact center to determine routing information for establishing a communications session between a user device and an agent device based on an event associated with a registered device. The process 500 is described as being performed by a computer system comprising one or more computers, for example, the communications system 100 shown in FIG. 1.

Referring to FIG. 5, the event server 158 receives event data associated with a registered device (501). For example, referring to FIG. 2, the temperature sensor of the registered device 230 may detect that the surrounding temperature has exceeded a threshold, and in response, the registered device 230 may transmit an indication to the digital service interface 140 alerting on the temperature increase. In response to receiving an indication from the registered device 230, the digital service interface 140 may transmit, to the contact center 102, event data that includes an identification of the registered device 230 and the state of the registered device 230. The event data may be routed to the event server 158 via a local area network 162.

The event server 158 determines resource requirements for handling the event (503). In some implementations, the event server 158 may determine that the identification of the registered device matches with a particular registered device profile of the registered device profiles. The event server 158 determines the resource requirements based on the particular registered device profile. In some implementations, registered device profiles of one or more registered devices are stored at the contact center database 154. The registered device profile may include serial numbers of registered devices, model numbers of registered devices, corresponding customer contact information, etc. In some implementations, service level agreements associated with one or more registered devices are stored at the contact center database 154. The event server 158 may retrieve, based on the identification of the registered device, a service level agreement associated with the registered device. The event server 158 may determine the resource requirement based on the service level agreement. For example, the contact center database 154 may store data and business rules which evaluate how to respond to this type of situation. Based on the received event data from the digital service interface 140 and/or the registered device profiles stored in the contact center database 154, the contact center 102 may determine that (i) the server is a registered device, (ii) the surrounding temperature associated with one of its servers is dangerously high; (iii) this alert is associated with the registered device 230, which is one of the most expensive servers that the enterprise makes; and (iv) this particular machine was purchased by XYZ Corporation, which is one of enterprise's largest and most important customers. Based on the business rules (e.g., the SLA) and the event, the event server 158 may determine the agents that are qualified to service and/or to provide sales for the XYZ Corporation.

The event server 158 generates routing information for establishing a communications session between a user of a user device and an agent device (505). For example, the event server 158 may work with the routing server 112 to generate the routing information. In some implementations, the event server 158 may generate routing information based on a registered device profile. In some implementations, the event server 158 may store the routing information for determining an inbound routing decision. For example, the event server 158 may determine that three contact channel options are available for this customer: (1) a telephone call, (2) Internet chat, and (3) a video interaction. The event server 158 may interact with the routing server 112 to determine how to route the incoming request for each of these channels, and store the routing information.

The event server 158 may optionally generate a dynamically generated message to be presented to the user (507). For example, based on the event data, the event server 158 may dynamically generate a message indicating that a server has experienced overheating. The message may be sent to the digital service concierge 140 or the user device 110 through an outbound queue using any of the appropriate channels.

The switch/media gateway 104 transmits contact information that includes a reserved contact for establishing the communications session with the agent device (509). In some implementations, the switch/media gateway 104 transmits the contact information to the user device 110. In some other implementation, the switch/media gateway 104 transmits the contact information to a digital service interface that is different from the user device 110. In some implementations, the reserved contact is a reserved telephone number. For example, after the event server 158 determines that three contact channel options and the contact information associated with each of the options, the switch/media gateway 104 may send the contact information to the digital service concierge 140 or the user device 110 through an outbound queue using any of the appropriate channels.

The switch/media gateway 104 receives a request to establish a communications session (511). For example, the switch/media gateway 104 may receive an inbound call from the user device 110. The routing server 112 determines whether the request corresponds to the routing information (513). In some implementations, the routing server 112 determines that the request includes the reserved telephone number based on a dialed number identification service (DNIS). For example, the communication server 108 may extract data about the customer interaction such as the caller's telephone number, often known as the automatic number identification (ANI) number, the dialed number, or the customer's internet protocol (IP) address, or email address, and communicate with other contact center components such as the routing server 112 in processing the call.

In response to determining that the request corresponds to the routing information, the routing server 112 interacts with the communication server 108 to route the request to the agent device (515). For example, after determining that the number dialed corresponds to the reserved telephone number, the routing server 112 may interact with the communication server 108 to route the request to the agent device for servicing the server.

The recommendation server 160 may optionally determine recommendations associated with the event (517). For example, if an enterprise server has been experiencing elevated temperatures in a data center, based on data and business rules stored in the contact center database 154, the recommendation server 160 may identify a data-center temperature management solution that the enterprise has recently released, so that the agent may timely present this solution to the customer during the communications session.

In some implementations, the iXn server 152 provides the identification of the registered device and the state of the registered device to the agent device. For example, the iXn server 152 may provide the identification of the registered device and the state of the registered device to the agent device based on customer data such as a customer profile or past interaction history with a customer. In some implementations, the iXn server 152 provides the recommendations associated with the event to the agent device. For example, the recommendation server 160 may interact with the iXn server 152 to push a recommendation to an agent device.

The communication server 108 establishes the communications session between the device and the agent device (519). In some implementations, the communication server 108 presents the dynamically generated message to the user of the user device after establishing the communications session between the user device and the agent device. For example, an automated message may be played to the user asking the user to confirm that the user is calling regarding the service of the enterprise server.

Figure 6:
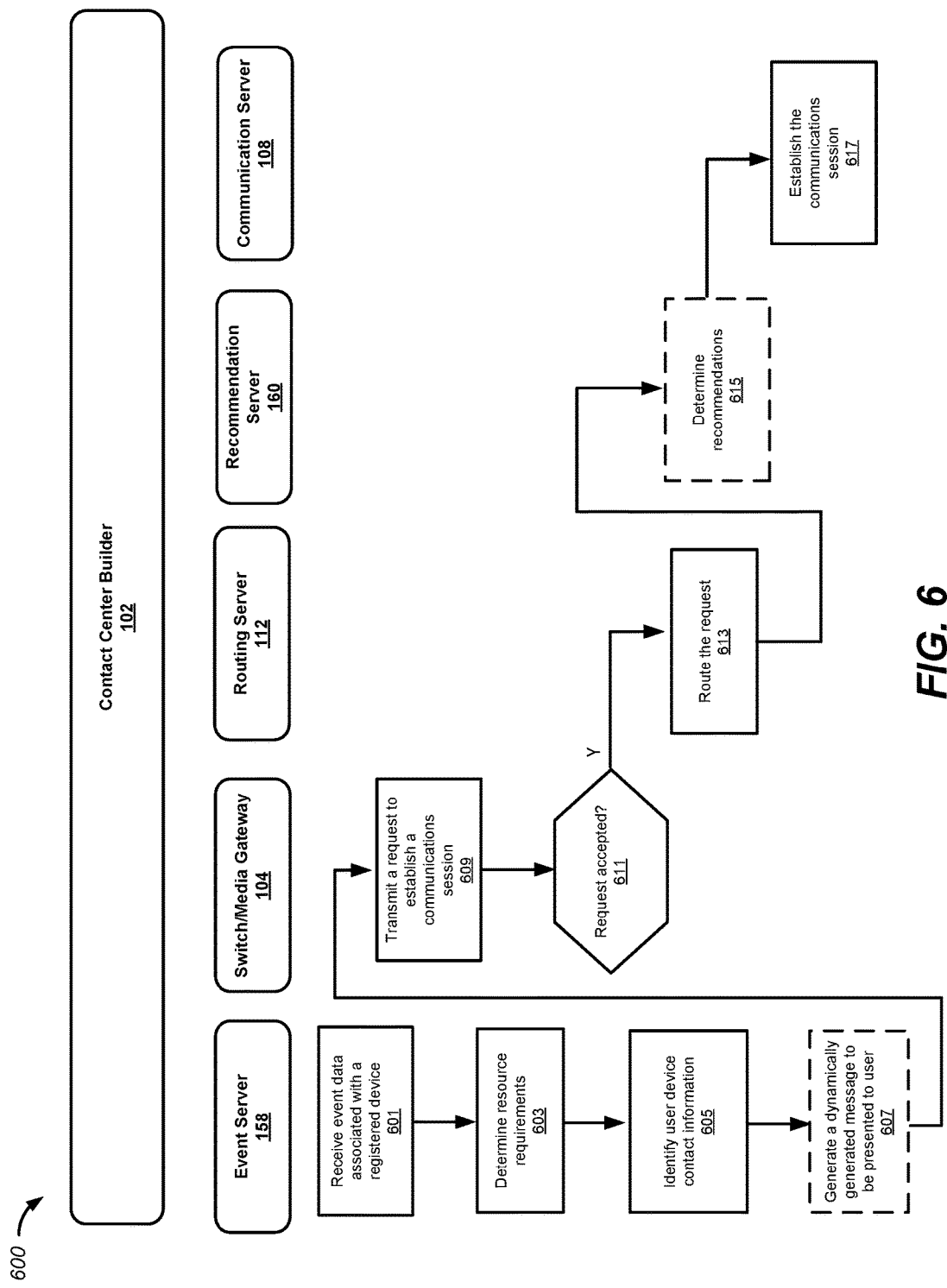
FIG. 6 is a flow chart illustrating an example of a process for a contact center to contact a user device in response to an event associated with a registered device.

FIG. 6 is a flow chart illustrating an example of a process 600 for a contact center to contact a user device in response to an event associated with a registered device in order to establish a communications session between the user device and an agent device. The process 600 is described as being performed by a computer system comprising one or more computers, for example, the communications system 100 shown in FIG. 1.

Referring to FIG. 6, the event server 158 receives event data associated with a registered device (601). For example, referring to FIG. 4, a customer may have purchased an extended warranty plan for a registered device 430 from the enterprise, which entitles the customer to free services calls every six months. After six months, a digital service interface 140 may identify that a service is due, and communicate with the contact center 102 to transmit event data that includes the identification of the registered device 430 and an indication that service is due for the registered device 430.

The event server 158 determines resource requirements for handling the event (603). For example, the event server 158 may determine that the most appropriate way to handle this event is to use a visual IVR application instead of using an agent.

The event server 158 identifies contact information of the user device for establishing a communications session between a user of the user device and an agent device (605). For example, the event server 158 may identify the phone number associated with the user device 110 that is stored in the contact center database 154. In some implementations, the contact information may include information related to one or more available channels where the user may be reached. For example, the contact information may include channel options indicating that the user may be reached by text, by phone, or by an application via the user device.

The event server 158 may optionally generate a dynamically generated message to be presented to the user (607). For example, the event server 158 may generate a message: "Hello, this is HVAC enterprise calling with an important message about your registered device 430. As part of your extended warranty plan, you are entitled to a free six-month check up by one of our service technicians. Please use the digital service interface to schedule your service call."

The switch/media gateway 104 transmits a request to establish a communications session (609). For example, the event server 158 may place a call request in the outbound queue of the switch/media gateway 104. The switch/media gateway determines whether the request is accepted by the user device (611). In response to determining that the request corresponds to the routing information, the routing server 112 interacts with the communication server 108 to route the request (613). For example, if the service call involves an agent, the routing server 112 may interact with the communication server 108 to route the request to an agent device.

The recommendation server 160 may optionally determine recommendations associated with the event (615). In some implementations, the iXn server 152 provides the identification of the registered device and the state of the registered device to the agent device. In some implementations, the iXn server 152 provides the recommendations associated with the event to the agent device. The communication server 108 establishes the communications session (617). For example, if the service call involves an agent, the routing server 112 may interact with the communication server 108 to route the request to an agent device. If the service call does not involve an agent, the communication server 108 may play the automated voice message and terminate the call.

Figure 7:
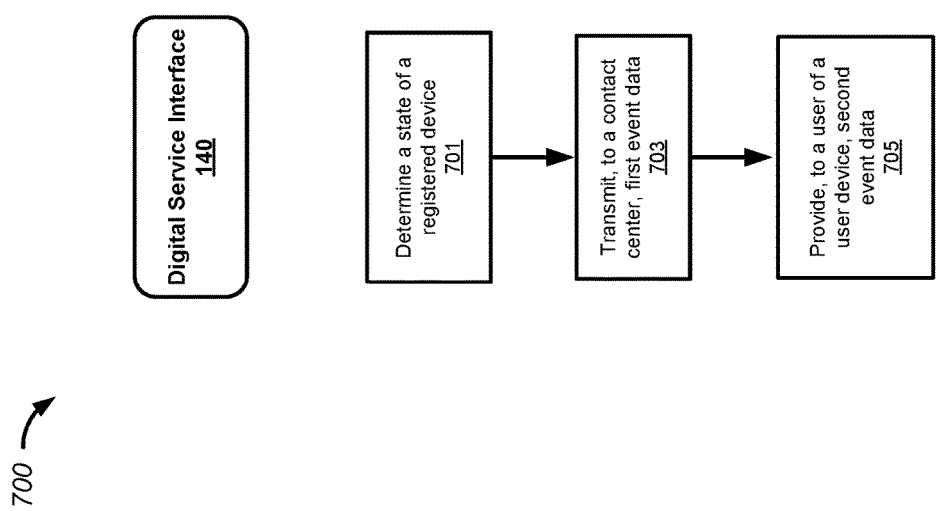
FIG. 7 is a flow chart illustrating an example of a process for a digital service interface to provide an interface for managing a communications session between a user device and a contact center.

FIG. 7 is a flow chart illustrating an example of a process 700 for a digital service interface to provide an interface for managing a communications session between a user device and an agent device of a contact center. The process 700 is described as being performed by a computer system comprising one or more computers, for example, the communications system 100 shown in FIG. 1. In some implementations, the digital service interface may be embedded in the registered device 130. In some other implementations, the digital service interface may be an application running on the user device 110. In some other implementations, the digital service interface may be implemented on a device that is different from the registered device and the user device such as a peripheral device to the registered device.

Referring to FIG. 7, the digital service interface 140 determines a state associated with a registered device (701). In some implementations, the digital service interface 140 receives data from the registered device indicating the state of the registered device. For example, a temperature sensor of a registered device may detect that the surrounding temperature has exceeded a threshold, and in response, the registered device may transmit an indication to the digital service interface 140 alerting on the temperature increase. In some implementations, the digital service interface 140 determines a state associated with a registered device by determining that data has not been received from the registered device within a predetermined time period. For example, the digital service interface 140 may send a ping message to an enterprise server at a predetermined frequency (e.g., once an hour) to determine that the server is still alive. In the case that the server has not responded to the ping message within a specified threshold time, the digital service interface 140 may determine that the server has failed.

The digital service interface 140 transmits, to a contact center, first event data that includes an identification of the registered device and the state of the registered device a state associated with a registered device (703). For example, in response to receiving an indication from a registered device that the surrounding temperature has exceeded a threshold, the digital service interface 140 may transmit, to the contact center 102, event data that includes an identification of the registered device and the state of the registered device.

In some implementations, the digital service interface 140 communicates, using a first communications protocol, with the registered device to obtain the state of the registered device. The digital service interface 140 may generate, based on a second communications protocol that is different from the first communications protocol, the first event data that includes the state of the registered device. The digital service interface 140 may transmit, using the second communications protocol, the first event data to the contact center 102. For example, the digital service interface 140 may be configured to communicate with a registered device using Bluetooth communication protocol, and the digital service interface 140 may be configured to communicate with the contact center 102 using the Hypertext Transfer Protocol (HTTP) protocol. As another example, the digital service interface 140 may be configured to communicate with a registered device using the Message Queuing Telemetry Transport (MQTT) or the Constrained Application Protocol (CoAP) protocol.

The digital service interface 140 provides, to a user of the user device, second event data that includes the state of the registered device and contact information for establishing the communications session with the contact center (705). In some implementations, the digital service interface 140 receives the contact information from the contact center 102. In some implementations, the digital service interface 140 presents, via a display of the digital service interface, the second event data to the user. For example, the contact center 102 may generate a reserved telephone number for handling the event, and the contact center 102 may transmit contact information that includes the reserved telephone number to the digital service interface 140. The digital service interface 140 may then provide to the user device 110, through a digital display of the digital service interface 140, the reserved telephone number and information related to the state of the registered device.

In some implementations, the digital service interface 140 transmits the second event data to the user device. For example, the digital service interface 140 may send an SMS message to the user device 110 indicating the reserved telephone number and information related to the state of the registered device.

In some implementations, after the communications session is established between the user device and the contact center, the digital service interface may receive a request from the contact center to obtain additional data associated with the registered device. In response to receiving the request from the contact center, the digital service interface may obtain the additional data from the registered device. The digital service interface may transmit the additional data to the contact center. For example, after a communications session between the user device 110 and an agent device to fix a malfunctioning server has been established, the agent may wish to obtain a current temperature sensor reading of the server. The agent may use the agent device to send a request to the digital service interface 140. In response to receiving the request, the digital service interface 140 may communicate with the server to obtain the current temperature sensor reading of the server. After the digital service interface 140 obtains the current temperature sensor reading of the server, the digital service interface 140 then sends the agent device a message reporting the current temperature sensor reading to help the agent to further assist the user.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. For example, a communications channel may include the Web, where a user may interact with an interaction site via a webpage generated dynamically according to the interaction flow. As another example, a communications channel may include a smart phone application, where a user may interact with an interaction site by starting a smart phone application, and the smart phone application then contacts the interaction site and provides a communications interface between the user and the interaction site. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer-implemented method for establishing a communications session between a user device and an agent device, the method comprising:
   receiving, by a processor associated with a contact center, prior to start of a communications session with the user device, event data that includes an identification of a registered device and a state of the registered device, wherein the registered device is different from the user device;
   determining, by the processor, a resource requirement based on the event data, the determining of the resource requirement being in anticipation of an interaction establishing the communications session with the user device;
   generating, by the processor, based on the resource requirement, routing information for routing the interaction to the agent device, wherein an agent associated with the aqent device is identified as satisfying the resource requirement;
   after generating the routing information, identifying, by the processor, a request to initiate the interaction;
   determining, by the processor, whether the request is related to the generated routing information; and
   in response to determining that the request is related to the generated routing information, routing the request to the agent device, wherein the routing is without input from the user device, during the interaction, of the identification of the registered device, and wherein the routing establishes the communications session between the user device and the agent device.

2. The method of claim 1, further comprising:
   storing the generated routing information;
   transmitting, by the processor, contact information that includes a reserved contact for establishing the communications session with the agent device, wherein the request for the interaction is directed to the reserved contact.

3. The method of claim 2, wherein transmitting the contact information further comprises transmitting the contact information to the user device.

4. The method of claim 2, wherein transmitting the contact information further comprises transmitting the contact information to a digital service interface that is different from the user device.

5. The method of claim 2, wherein the reserved contact is a reserved telephone number, and wherein determining that the interaction is related to the generated routing information comprises determining that the interaction is directed to the reserved telephone number.

6. The method of claim 1, further comprising:
   providing the identification of the registered device and the state of the registered device to the agent device.

7. The method of claim 1, further comprising:
   determining, by the processor, based on the event data, a dynamically generated message to be presented to the user of the user device during the communications session between the user device and the agent device; and in response to determining that the interaction is related to the generated routing information, communicating, after establishing the communications session between the user device and the agent device, the dynamically generated message to the user device for presentation to the user.

8. The method of claim 1, further comprising:

identifying contact information of the user device;

transmitting, by the processor, to the user device, a request to establish the communications session between the user device and the agent device;

determining, by the processor, that the request has been accepted by the user device, wherein the request to initiate the interaction is in response to determining that the request has been accepted by the user device.

9. The method of claim 1, further comprising:

determining, by the processor, based on the event, one or more recommendations associated with the registered device; and providing the one or more recommendations associated with the registered device to the agent device.

10. The method of claim 1 further comprising:

storing registered device profiles of one or more registered devices, wherein determining the resource requirement for the communications session between the user device and the agent device further comprises:

determining that the identification of the registered device matches with a particular registered device profile of the registered device profiles; and determining the resource requirement based on the particular registered device profile.

11. The method of claim 1, wherein determining the resource requirement for the communications session between the user device and the agent device further comprises:

retrieving, based on the identification of the registered device, a service level agreement associated with the registered device; and determining the resource requirement based on the service level agreement.

12. The method of claim 1, wherein the routing is without input from the user device, during the interaction, of the state of the registered device.

13. A computer-implemented system comprising:

one or more processors and one or more non-transitory computer-readable storage devices storing instructions that, when executed by the one or more processors, cause the one or more processors to perform respectively operations comprising:

receiving, prior to start of a communications session with a user device, event data that includes an identification of a registered device and a state of the registered device;

determining, based on the event data, a resource requirement, the determining of the resource requirement being in anticipation of an interaction establishing a communications session with the user device;

generating, based on the resource requirement, routing information for routing the interaction to the agent device, wherein an agent associated with an agent device is identified as satisfying the resource requirement after generating the routing information, identifying a request to initiate the interaction;

determining whether the request is related to the generated routing information; and in response to determining that the request is related to the generated routing information, routing the request to the agent device, wherein the routing is without input from the user device, during the interaction, of the identification of the registered device, and wherein the routing establishes the communications session between the user device and the agent device.

14. The system of claim 13, wherein the operations further comprise:

storing the generated routing information;

transmitting contact information that includes a reserved contact for establishing the communications session with the agent device, wherein the request for the interaction is directed to the reserved contact.

15. The system of claim 13, wherein the operations further comprise:

identifying contact information of the user device;

transmitting, to the user device, a request to establish the communications session between the user device and the agent device;

determining that the request has been accepted by the user device, wherein the request to initiate the interaction is in response to determining that the request has been accepted by the user device.

16. The system of claim 13, wherein the operations further comprise:

storing registered device profiles of one or more registered devices, wherein determining the resource requirement for the communications session between the user device and the agent device further comprises:

determining that the identification of the registered device matches with a particular registered device profile of the registered device profiles; and determining the resource requirement based on the particular registered device profile.

* * * * *